May 30, 1967　　　D. M. TENNISWOOD　　　3,321,917
MOTOR VEHICLE BRAKING SYSTEM
Filed July 2, 1965　　　　　　　　　　　　　3 Sheets-Sheet 1
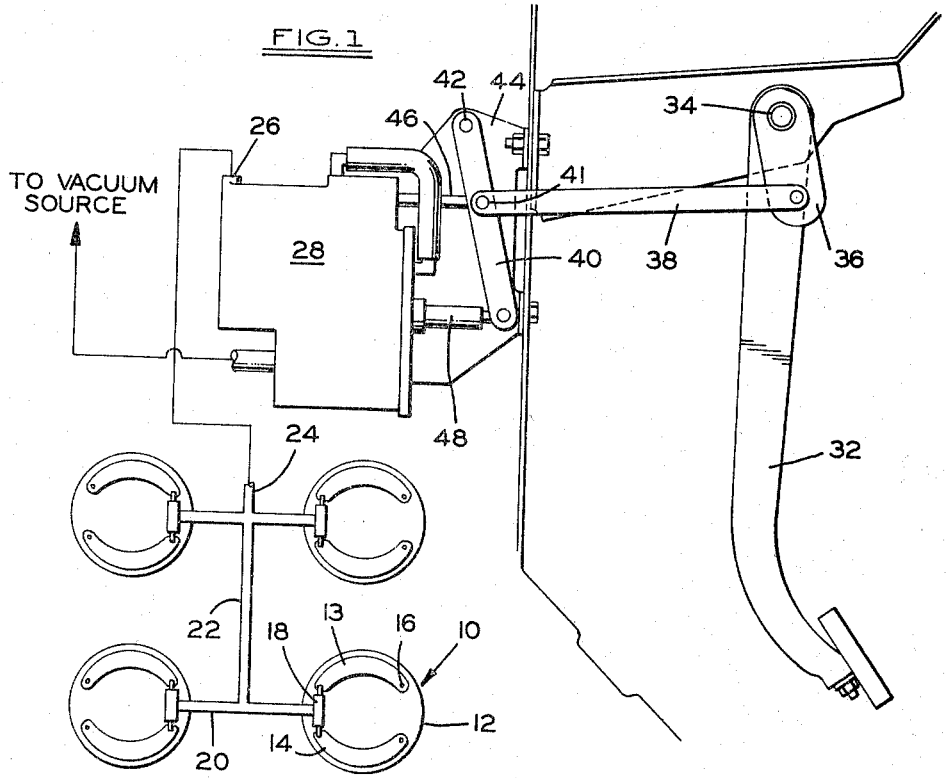
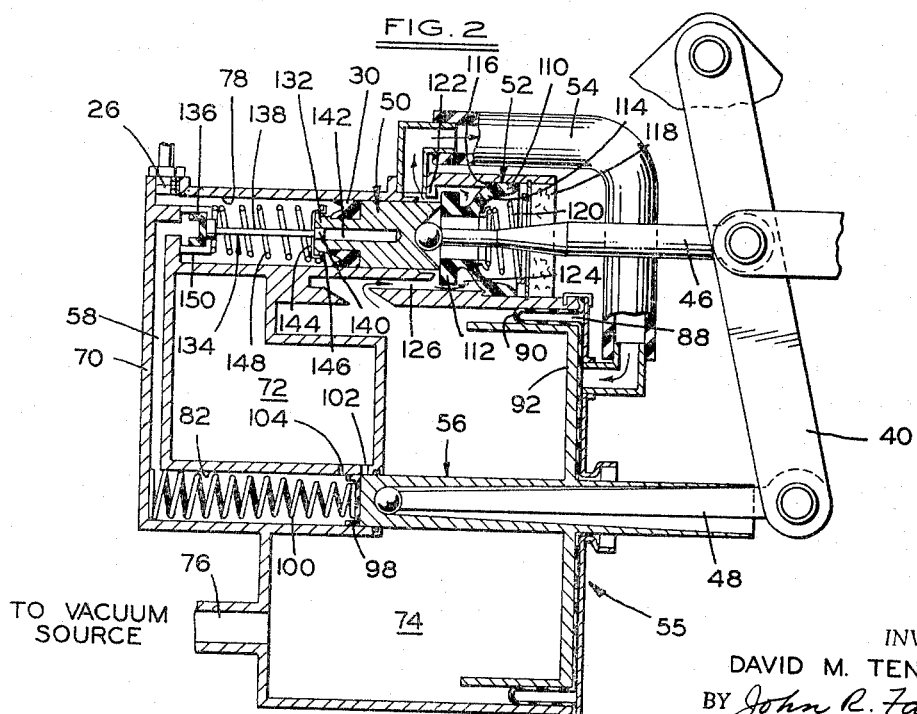
INVENTOR.
DAVID M. TENNISWOOD
BY John R. Faulkner
Robert S. McCollum
ATTORNEYS May 30, 1967  D. M. TENNISWOOD  3,321,917
MOTOR VEHICLE BRAKING SYSTEM Filed July 2, 1965  3 Sheets-Sheet 2

INVENTOR.
DAVID M. TENNISWOOD
BY John R. Faulkner
Robert S. McCollum

May 30, 1967     D. M. TENNISWOOD     3,321,917
MOTOR VEHICLE BRAKING SYSTEM
Filed July 2, 1965     3 Sheets-Sheet 3

INVENTOR.
DAVID M. TENNISWOOD
BY
John R. Faulkner
Robert S. McCollum
ATTORNEYS

United States Patent Office 3,321,917
Patented May 30, 1967

3,321,917
MOTOR VEHICLE BRAKING SYSTEM
David M. Tenniswood, Detroit, Mich., assignor to Ford Motor Company, Dearborn, Mich., a corporation of Delaware
Filed July 2, 1965, Ser. No. 469,263
7 Claims. (Cl. 60—54.5)

This invention relates to a power braking system for a motor vehicle. More particularly, it relates to one that is capable of being precharged to substantially any desired hydraulic line pressure with short foot pedal travel and low pedal effort. It also relates to a combination power and manual follow-up system in which there is no transition in the rate of change of foot effort upon completion of one and beginning of the other. It further relates to a prechargeable braking system in which the line pressure can be modulated to any degree to provide the vehicle deceleration desired.

Known vaccum booster brake systems have several disadvantages. One is that they generally provide a noticeable change in the foot effort when vacuum runout occurs; that is, when the vacuum servo has provided its maximum effect and the manual follow-up system takes over. In substantially all cases, considerable foot effort is required to appreciably increase the hydraulic line pressure after vacuum runout. In fact, pressures greater than 1500 p.s.i., which may be required under emergency conditions, as a rule cannot be obtained with the standard booster systems because the extremely high foot effort required is generally beyond most drivers' capabilities.

Another disadvantage of conventional booster units is in the amount of foot pedal travel required to charge the brake system to a point where it will begin decelerating the vehicle. In most systems, approximately 60% of the pedal travel is wasted merely in taking up the slack in the system.

This invention eliminates the above disadvantages by providing; first, a full power brake system that is capable of being precharged to substantially any desired hydraulic line pressure necessary to provide deceleration of the vehicle for most brake stops; and, secondly, a manual follow-up brake system that provides fail safe operation under all conditions of operation. The system accomplishes this without a noticeable change of foot effort during the transition between power unit runout and the application of the manual braking system, and eliminates the wasted portion of the foot pedal travel that generally must take place prior to deceleration.

The system, in general, includes an air/vacuum servo that is activated almost instantaneously upon depression of the brake pedal to raise the line pressure in the system to the degree necessary to take up the slack in the system and provide the desired amount of deceleration of the vehicle. The pressure can be modulated over the entire precharge pressure range with very little pedal travel by selectively controlling the movements of a fluid flow sequencing valve. A line pressure feedback against the operator's foot is provided so that when vacuum runout occurs, there is no noticeable transition in the rate of change of foot effort during a manual follow-up operation to provide higher line pressures.

One of the objects of the invention, therefore, is to provide a full power and manual follow-up brake system for a motor vehicle in which the system can be precharged to the level necessary to decelerate the vehicle for most brake stops, with no transition in rate of change of foot effort during change-over from the precharging to the manual follow-up phase.

Another object of the invention is to provide a motor vehicle vacuum power brake system that is simple in construction and economical to manufacture, and provides higher hydraulic line pressures than conventional power braking systems, with lower foot pedal travel and efforts.

A further object of the invention is to provide a full power brake system in which the operator can modulate the line pressure to the degree desired.

A still further object of the invention is to provide a power brake system with an auxiliary manual follow-up control that becomes operable upon failure of the power unit to provide full deceleration of the vehicle with foot pedal efforts that are within the capabilities of the operator.

Another object of the invention is to provide a full power braking system that provides high hydraulic line pressures by short foot pedal travel and low pedal effort without sacrificing performance or safety.

A still further object of the invention is to provide a full power braking system having a line pressure precharging unit that is controlled by short travel foot pedal movements and low pedal efforts to provide the line pressure necessary to provide most decelerations of the vehicle; and one in which the precharging power components and manual follow-up components are separable to permit installation in isolated portions of a motor vehicle, thereby providing the most advantageous use of available vehicle space.

It is also an object of the invention to provide a motor vehicle power brake system that includes: a vacuum motor to progressively precharge the system to the desired pressure level up to the point at which vacuum runout occurs; a feedback control to the operator foot pedal to reflect changes in line pressure so that above vacuum runout there is no transition in foot pedal travel or the rate of change of foot pedal effort; and, an air/vacuum sequencing valve operable upon initial depression of the brake pedal to activate the vacuum motor to provide the line pressure desired up to a maximum that is considerably higher than that generally available with conventional power braking units.

Other objects, features and advantages of the invention will become apparent upon reference to the succeeding, detailed description thereof, and to the drawings illustrating the preferred embodiments thereof; wherein, FIGURE 1 schematically illustrates a motor vehicle braking system constructed according to the invention;

FIGURE 2 shows an enlarged cross-sectional view of the master cylinder assembly of FIGURE 1;

Figure 7:
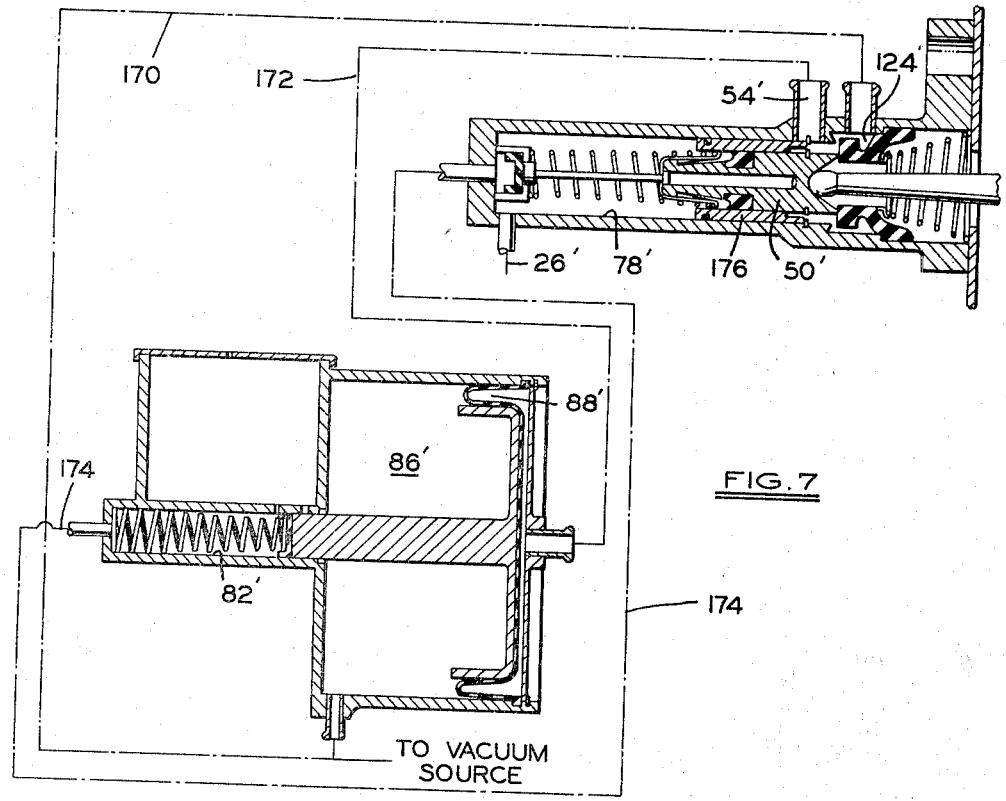
Figure 6:
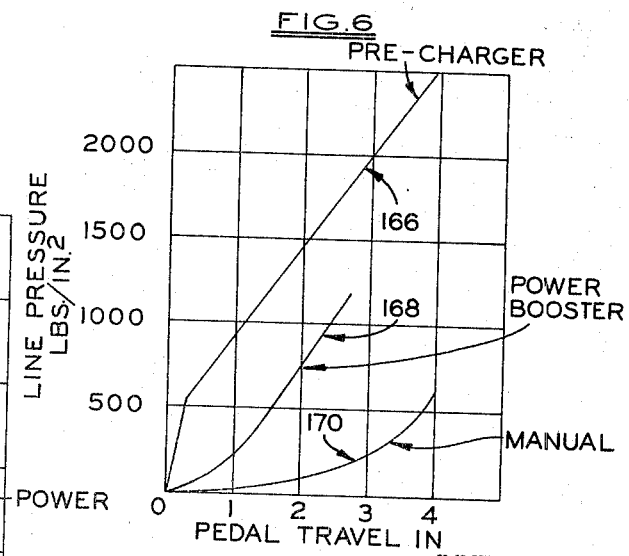
Figure 5:
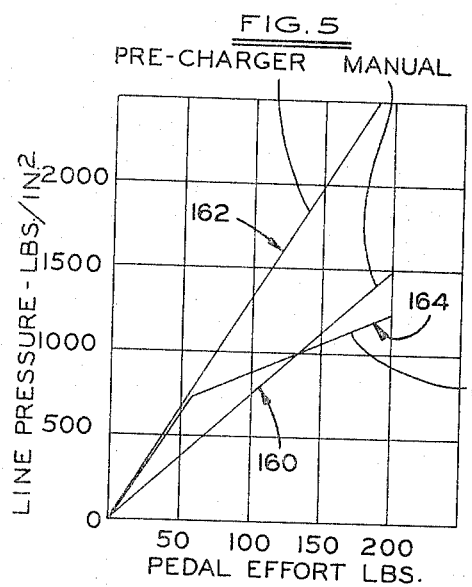

FIGURES 5 and 6 graphically illustrate line pressure changes versus foot pedal travel and efforts for conventional power braking systems as compared to the braking system constructed according to the invention; and, FIGURE 7 shows another embodiment of the invention.

FIGURE 1 schematically illustrates a braking system constructed according to the invention. It includes a fluid pressure actuated mechanical friction brake 10 for each wheel, which in this case is four. The brake per se is of a known construction, and includes a drum 12 secured to the wheel and cooperating with a pair of arcuately movable primary and secondary brake shoes 14 and 16. The shoes are pivotally mounted at one end 18 against stationary anchor pins, and are biased inwardly at their opposite ends against the ends of the plungers of a wheel cylinder 20. The wheel cylinders are actuated by fluid under pressure supplied from lines 22 and 24 connected to a high pressure outlet 26 from a brake master cylinder assembly 28. The master cylinder assembly translates the foot effort of an operator applied to a brake pedal 30 into a high pressure fluid force that varies generally as a function of the change in foot effort by the operator.

Brake pedal 30, in this instance, is fixed to a lever 32 pivotally mounted on a fixed pin 34. A second lever 36 is fixed for movement with lever 32, and has a pivotal connection to a link 38. The opposite end of link 38 is pivotally connected by a pin 41 to a link 40 pivotally mounted at its upper end 42 on a portion 44 of the vehicle chassis. A vacuum motor piston rod 46 is pivotally connected by pin 41 to both links 40 and 38. The lower end of link 40 is pivotally connected to a rod 48 that is an emergency actuating control member, and acts in a manner that will be described later.

In general, as best seen in FIGURES 1 and 2, the first increment of leftward travel of link 38, upon depression of brake pedal 30, moves plunger rod 46 and a piston 50 to the left. This permits the movement of an air/vacuum sequencing or scheduling valve 52 to admit air through a tube 54 to one side of a diaphragm type vacuum motor 55 to move a second piston 56. One side of the motor is always connected to a source of vacuum. The motor, therefore, immediately precharges the brake system through a line 58 and outlet 26 to a line pressure sufficient to take up the slack in the system and apply the vehicle brakes. The increasing line pressure reacts against the first piston 50, the reaction being transmitted back through the linkage 46 and 38 to brake pedal 30 to be sensed by the operator's foot. When full vacuum runout has occurred, that is, when the maximum possible pressure differential that is obtainable acts on vacuum motor 55, further increase in the line pressure is obtained only upon further depression of the brake pedal. However, there will be no transition in the rate of change of foot effort at vacuum runout since the line pressure build-up is continually sensed by the operator through the brake pedal. Further depression of the foot pedal now moves piston 50 first to close the line connection between the chamber containing piston 56 and the outlet 26 and subsequently, to displace fluid through outlet 25 to the wheel cylinders to increase the pressure proportionally.

In the event of a failure in the vacuum system, depression of brake pedal 30 is accompanied by movement of the emergency rod 48 to manually and progressively move power piston 56 to increase the pressure in the system until the power piston has bottomed. Continued depression of the pedal then further raises the brake system line pressure by the manual movement of master cylinder piston 50, in the manner already described above.

More specifically, FIGURE 2, which is essentially to scale, shows the master cylinder assembly of FIGURE 1 having: a main housing 70, suitably partitioned to provide a brake fluid reservoir 72; a vacuum tank or reservoir 74, connected to a source of vacuum through a tube 76; and a primary master cylinder bore 78 containing piston 50, and connected in parellel to the high pressure outlet 26 and to a power vacuum motor piston chamber 82 by the connecting line 58.

Vacuum tank 74 is divided into two compartments 86 and 88 by an annular diaphragm 90 secured to an end portion of the tank. The diaphragm is abutted by a power piston 92 that is formed integral with piston 56. The end of piston 56 sealingly projects out through the vacuum tank, and is recessed to loosely receive the end of rod 48. A spring 100 seated in bore 82 biases an annular one-way cup seal 98 against the end of piston 56, and aids in biasing the brake lever 32 to a brake released position. Brake fluid reservoir 72 is connected to bore 82 by a port 102 and a restricted fluid compensating port 104. The cup seal 98, when moved to the left past ports 102 and 104, permits flow from the reservoir into bore 82, but prevents return flow of fluid past the seal.

Vacuum motor compartment 88 is alternately connected to air or vacuum through conduit 54. Subjection of the opposite end of the tube to air or vacuum is controlled by the seating or unseating movement of piston 50 with respect to the rubber sequencing valve 52. The valve consists of two annular portions 110 and 112 connected by a thin web 114. Portion 110 is seated against a shoulder 116 in an enlarged portion of bore 78. A filter 118 is fitted into this end of the bore, but, otherwise, air at atmospheric or ambient pressure is free to enter the space internally of the valve member.

Portion 112 of valve 52 is biased to the left by a spring 120, either against the end of piston 50 to seal the air port between the two; or, when piston 50 is moved to the left, against a knife edge seat 122 formed on the housing. When positioned against seat 122, the annular chamber 124 formed between the seal and housing is sealed from tube 54. This latter chamber is connected by a bore 126 to vacuum chamber 86.

Manually operated piston 50 has a shallow recess at its right end, in which is located the end of actuating rod 44. An annular fluid seal 130 surrounds a stem portion 132 on the left-hand side of piston 50, and prevents fluid in bore 78 from entering tube 54. Piston 50 also supports a port closure member 134, which, when seated, closes the outlet from line 58. Member 134 includes an annular sealing member 136 fixed to the headed portion of a stem 138. The stem at its opposite end has another enlargement 140 that is slidable in a bore 142 in piston 50. The enlarged end portion 140 is retained in bore 142 by an annular cup-shaped retainer 144 having a locking finger 146 abutting a shoulder on piston stem 132. The retainer also serves as a seat for a compression spring 148 seated at its opposite end on a tubular boss 150. The boss has circumferential openings to permit passage of fluid from line 58 into the high pressure outlet 26 when the port seal 136 is in the position shown in FIGURE 2.

Figure 3:
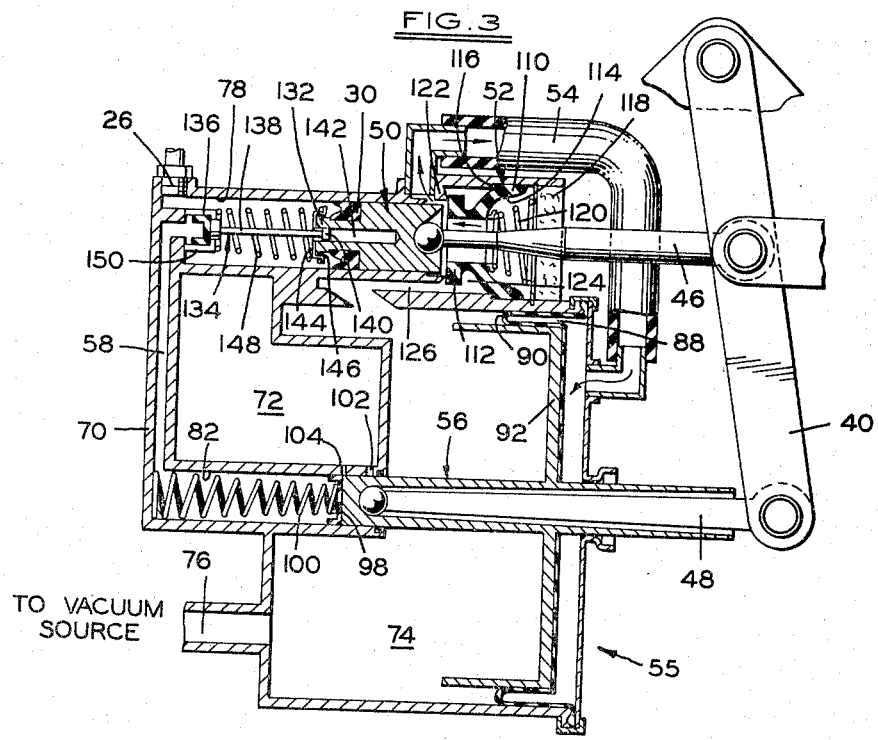
FIGURES 3 and 4 are cross-sectional views similar to FIGURE 2, showing the parts in different operative positions.
Figure 4:
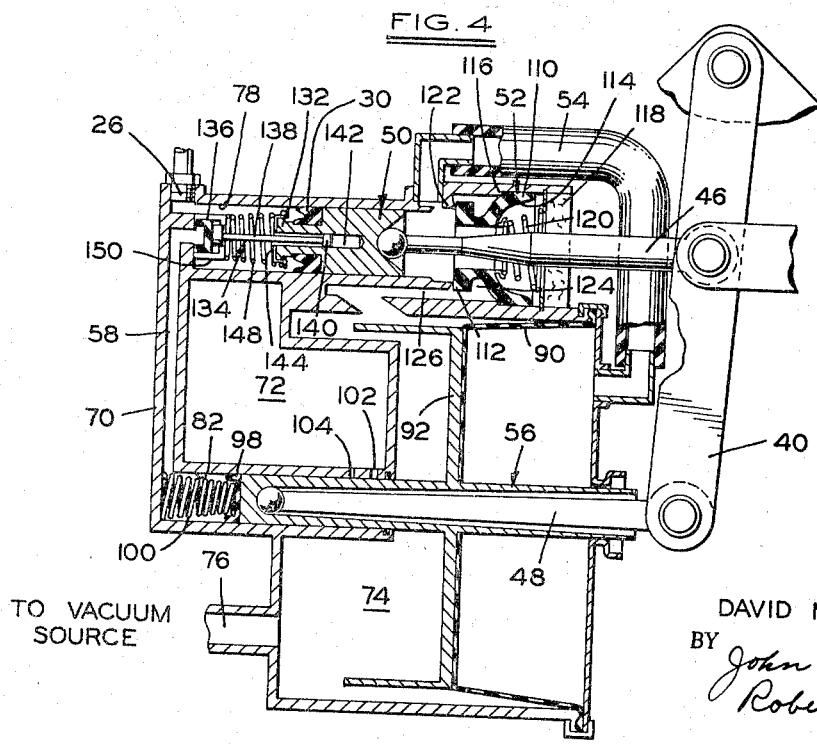

The various phases of operation of this embodiment of the brake master cylinder assembly are shown in FIGURES 2, 3 and 4. FIGURE 2 shows the system when it is inoperative, or when the brake pedal is in its released position. FIGURE 3 shows the positions of the parts when the system has been pre-charged by the initial movement of piston 50 and sequencing valve 52, and operation of the vacuum motor 55. FIGURE 4 shows the positions when vacuum runout has occurred, and the follow-up manual braking system is in operation.

More specifically, referring to FIGURE 2, when the operator's foot is removed from brake pedal 30, springs 148 and 100 move pistons 50 and 56 to the right to return pedal 30 to the brake pedal released position. The rightward movement of piston 50 first engages it with the face of valve portion 112 to close off the air inlet port between the two. Continued rightward movement moves valve portion 112 to the right against its spring bias to open the vacuum port between it and seat 122, thus connecting chamber 124 and tube 54 to the vacuum in chamber 86. Accordingly, vacuum acts now through tube 54 on motor chamber 88 to balance the vacuum forces on opposite sides of diaphragm 90. The force of spring 100, therefore, is sufficient to move pistons 56 and 92 and diaphragm 90 to the position shown in FIGURE 2, opening reservoir fluid compensating port 104. Simultaneously, the rightward movement of port closure seal 136 by piston 50 permits make-up fluid to flow from reservoir 72 through compensating port 104 and line 58 into line 26 to supply any additional fluid to the system that may be needed at this time.

Referring now to FIGURES 2 and 3, when braking, or deceleration of the vehicle is desired, depression of pedal 30 rotates lever 32 to move rods 38 and 46 leftwardly. This moves piston 50 and valve member 52 leftwardly together until the face of the valve portion 112 seals against seat 122. The vacuum port between the two thus closes, momentarily sealing the vacuum motor chambers 86 and 88. Continued leftward movement of piston 50 disengages the right face of the piston from valve portion 112, and opens the air port between the two. Air at atmospheric or ambient pressure can now enter tube 54 and motor chamber 88 from the air space enclosed by valve 52, as shown in FIGURE 3. The differential in pressure on opposite sides of piston 92 immediately forces piston 92 to the left, moving piston 56 against the force of spring 100 to displace the fluid in bore 82 out through line 58, past seal 136, and into outlet 26 leading to the wheel cylinders. Emergency rod 48 contributes no movement to piston 92. Since the brake fluid is relatively incompressible, a progressive pressure build-up in the system occurs from zero to a maximum of approximately 500 p.s.i., for example, before power piston 92 bottoms out at vacuum runout.

In the event of a vacuum failure, depression of brake pedal 30 will move piston 50 to the left. Depression of the pedal will also move lower rod or link 48 to the left to manually move pistons 92 and 56 to precharge the system manually through lines 58 and 26. The connections between the linkages and their dimensions are such that when this operation becomes necessary, the mechanical advantage is sufficient to provide full braking operation within the capabilities of the operator.

It will be noted that since the hydraulic line pressure in bore 82 and line 58 also acts directly against the front face area of piston 50, the only feedback that the operator will feel is this force reduced by the areas involved and the mechanical advantage of the linkage. For this reason, at vacuum runout, there will be no transition in the rate of change of foot effort when the change-over to the manual brake apply system is made.

It should be noted at this time, that only a very small increment of foot pedal travel is required to produce this particular action. And, since the movements are progressive, the pressure in line 58 can be modulated to the degree desired to provide a particular deceleration. Therefore, it will be clear that any degree of deceleration of the vehicle can be obtained merely by progressively modulating the opening of the air/vacuum ports. The entire pedal travel for this phase of operation, and movement of piston 50 and valve 52 occurs within a distance of approximately only .030 inch pedal travel, for example. Thus, it will be evident that only very short pedal travel is required to fully actuate the power unit to decelerate the vehicle to the degree desired.

As stated previously, FIGURE 4 shows the condition of operation after the precharging operation has been completed, and the manual system has taken over; that is, after vacuum runout has caused power pistons 92 and 56 to move as far to the left as possible. Brake pedal 30 has been depressed beyond the precharging position so that piston 50 now has moved sufficiently to the left to seat port seal member 136 and thereby isolate the precharging pressure increasing bore 82 from the brake system. Continued leftward movement of piston 50, therefore, continues to displace fluid from chamber 78 into outlet 26 and through the brake system to further increase the pressure build-up to a level approximating 2,000 p.s.i., for example.

To return the system to its inoperative position, the operator releases brake pedal 30, which permits the force of springs 100 and 148, and the residual pressure of fluid in chambers 78 and 82 to act against pistons 50 and 56 and move them and linkage 44, 48, 38 and 32 to the right towards the positions shown in FIGURE 2. As piston 50 moves progressively to the right, it first unseats port seal 134, and then later contacts the face of valve portion 122 to seal the air port between the two. Continued rightward movement moves the valve portion off seat 122 and opens the vacuum port between the two to admit vacuum to act on tube 54 and motor chamber 88. Thus, chambers 86 and 88 are returned to a balanced pressure condition, and piston 92 is moved to the position shown in FIGURE 2 by action of spring 100 on piston 56. When piston 56 reaches the position shown in FIGURE 2 opening compensating port 104, fluid may flow from reservoir 72 into the brake lines to make up for any leakage losses occasioned during the braking operation.

FIGURE 5 graphically compares the changes in line pressure with the changes in operator pedal effort for the precharger of the invention and conventional manual and power operated brake systems. It will be seen that according to the manual braking systems curve 160, the line pressure rises without a change in slope, but at a slower rate than curve 162 representing the changes in the precharger and manual system of the invention, resulting in a greater pedal effort on the part of the manual systems to obtain the same degree of deceleration of the vehicle. Also, with respect to the power braking systems curve 164, it will be seen that at the point of vacuum runout, there is a definite transition or change in the slope of the curve so that the rate of pressure increase now is considerably lower for the same degree of pedal effort as compared to the braking system of the invention. The precharger construction, as stated previously, maintains the same slope throughout the complete operation without a transition in rate of change of pedal effort after vacuum runout. Thus, the operator does not perceive any change in rate of braking effort once the power unit has completed its operation and the manual system takes over.

FIGURE 6 graphically compares the changes in line pressure with the changes in pedal travel, for the system of the invention and power booster brake systems and manually operated brake systems. It will readily be seen that the precharger construction indicated by curve 166 achieves a rapid increase in line pressure with relatively little pedal travel until vacuum runout occurs; and subsequently, the rate of change of line pressure is equal to or greater than the power booster units and the manually operated systems represented by curves 168 and 170. Both the power booster and manual brake systems curves show that considerable pedal travel is wasted before sufficient line pressure is developed to begin decelerating the vehicle.

Summarizing, therefore, FIGURES 5 and 6 show that the brake system constructed according to the invention not only provides an increased line pressure for the same pedal effort of the known systems, but also begins decelerating the vehicle much sooner than the known systems, and has a higher maximum decelerating pressure that is still within the foot pedal force apply capabilities of an operator.

FIGURE 7 shows another embodiment of the invention. The details of construction and operation of FIGURE 7, however, are substantially the same as those shown and described in connection with the FIGURES 1–4 embodiments. In FIGURE 7, however, the vacuum motor initiating and manual follow-up unit is separated from the vacuum power precharge unit. This permits the installation of these units in a vehicle engine compartment, for example, or other compartments, in separated locations rather than as a unitary construction, thus utilizing more effectively the space available. FIGURE 7 differs in detail from the FIGURE 2 construction in the use of flexible tubing for the various connections. Tubes 170 and 172 connect the various vacuum motor compartments 86′ and 88′ to the sequencing valve vacuum compartment 124′ and tube 54′. Also, a line 174 connects the brake fluid under pressure from bore 82′ of the power unit to the fluid outlet 26′. Substantially the only other change is the inclusion of a sleeve 176 in the bore 78′ to serve as a guide for piston 50′. The remaining details and operation of FIGURE 7 are the same as already described in connection with FIGURE 2, and, therefore, are not repeated.

While the invention has been illustrated in its preferred embodiments in the figures, it will be clear to those skilled in the arts to which the invention pertains that many changes and modifications may be made thereto without departing from the scope of the invention.

I claim:
1. A hydraulic brake system for a motor vehicle having wheel cylinders for applying the vehicle brakes, comprising, a master cylinder assembly including a fluid chamber defined by a pair of spaced pistons therein having opposed chamber pressure increasing movements and each movable to transmit fluid under pressure from said chamber to said wheel cylinders, a brake pedal, force transmitting means connecting said pedal and one of said pistons, power operated means for moving the other of said pair of pistons in a chamber fluid pressure increasing direction, a source of actuating fluid connected to said power means, and flow modulating valve means axially aligned with and initially abutting said one piston for a limited movement therewith in response to movement of said force transmitting means for modulating the flow of said actuating fluid to said power means between a minimum and maximum to provide a first progressive change in the fluid pressure in said chamber and wheel cylinders between a minimum and a predetermined amount, movement of said force transmitting means beyond a position providing said predetermined chamber pressure moving said one piston to further increase the fluid pressure to said wheel cylinders.

2. A hydraulic brake system for a motor vehicle having wheel cylinders for applying the vehicle brakes, comprising, a master cylinder assembly including a pair of interconnected fluid chambers each having a piston therein movable to transmit fluid under pressure from its chamber to the other and to said wheel cylinders, a brake pedal, force transmitting means connecting said pedal and one of said pistons, power operated means for moving the other of said pair of pistons, a source of actuating fluid connected to said power means, and flow modulating valve means axially aligned with and initially abutting said one piston for a limited movement therewith in response to initial movement of said force transmitting means for modulating the flow of said actuating fluid to said power means between a minimum and maximum to provide a first progressive change in the fluid pressure in said chamber and wheel cylinders between a minimum and a predetermined amount, further movement of said force transmitting means beyond a position providing said predetermined chamber pressure moving said one piston to further increase the fluid pressure to said wheel cylinders.

3. A brake system as in claim 2, said force transmitting means including means engaging said power means for moving said power means during the movement of said force transmitting means upon failure of said power means.

4. A hydraulic brake system for a motor vehicle having wheel cylinders for applying the vehicle brakes, comprising, a master cylinder fluid chamber having a piston slidable therein to transmit fluid therein under pressure to said wheel cylinders, means connecting said chamber and wheel cylinders, a brake pedal, force transmitting means connecting said pedal and piston, a second fluid chamber connected to said first chamber and having a piston slidable therein to transmit fluid under pressure to said first chamber and wheel cylinders, power operated means for moving said second chamber piston in a fluid pressure increasing direction, a source of actuating fluid connected to said power means, and variably movable valve means axially aligned with and initially abutting said one piston for a limited movement therewith in response to movement of said force transmitting means for modulating the flow of said actuating fluid to initial movement of said power means between a minimum and maximum to provide a progressive change in the fluid pressure in both of said chambers with progressive movement of said plunger means in one direction, further movement of said force transmitting means beyond a position providing said maximum pressure by said power means moving said master cylinder piston to increase the fluid pressure to said wheel cylinders.

5. A hydraulic brake system for a motor vehicle having wheel cylinders for applying the vehicle brakes, comprising, a master cylinder assembly including a pair of spaced interconnected fluid chambers each having a piston movable therein to transmit fluid under pressure from its chamber to the other and to said wheel cylinders, conduit means interconnecting said chambers, a brake pedal, force transmitting means connecting said pedal and one of said pistons, power operated means for moving the other of said pair of pistons in a chamber fluid pressure increasing direction, a source of actuating fluid connected to said power means, flow modulating valve means axially aligned with and initially abutting said one piston for a limited movement therewith in response to movement of said force transmitting means for modulating the flow of said actuating fluid to said power means between a minimum and maximum to provide a first progressive change in the fluid pressure in said chamber and wheel cylinders between a minimum and a predetermined amount, and means movable by said one piston for blocking the said conduit means, movement of said force transmitting means beyond a position providing said predetermined chamber pressure moving said one piston and said movable means to block said conduit means and further increase the fluid pressure in said one piston chamber and to said wheel cylinders.

6. A hydraulic brake system for a motor vehicle having wheel cylinders for applying the vehicle brakes, comprising, a master cylinder assembly including a fluid chamber defined between a pair of spaced pistons having opposed chamber pressure increasing movements and each movable to transmit fluid under pressure from said chamber to said wheel cylinders, a brake pedal, force transmitting means connecting said pedal and one of said pistons, power operated means for moving the other of said pair of pistons in a chamber fluid pressure increasing direction, a source of actuating fluid connected to said power means, and flow modulating valve means axially aligned with and initially abutting said one piston for a limited movement therewith in response to initial progressive movement of said force transmitting means for modulating the flow of said actuating fluid to said power means between a minimum and maximum to provide a first progressive change in the fluid pressure in said chamber and wheel cylinders between a minimum and a predetermined amount, further movement of said force transmitting means beyond a position providing said predetermined chamber pressure moving said one piston to further increase the fluid pressure to said wheel cylinders, said one piston constituting a fluid pressure reaction member during the progressive changes in said pressure in said chamber whereby a reaction force feedback is sensed at all times at said brake pedal to provide an uninterrupted rate of change of brake pedal effort during the changeover from said predetermined pressure increase to the further increase provided by further movement of said force transmitting means.

7. A hydraulic brake system for a motor vehicle having wheel cylinders for applying the vehicle brakes, comprising, a master cylinder assembly including a fluid chamber defined between a pair of spaced pistons therein having opposed chamber pressure increasing movements and each movable to transmit fluid under pressure from said chamber to said wheel cylinders, a brake pedal, force transmitting linkage means connecting said pedal and one of said pistons, power operated means for moving the other of said pair of pistons in a chamber fluid pressure increasing direction, said power means comprising a differentially operated fluid motor, a source of fluid at one pressure connected to opposite sides of said motor, a source of actuating fluid at a different pressure connected to one side of said motor, and flow modulating valve means axially aligned with and initially abutting said one piston for a limited movement therewith between positions controlling the flow of fluid from said sources in response to initial progressive movement of said force transmitting means for modulating the flow of said fluid at said different pressure to said power means between a minimum and maximum to provide a first progressive change in the fluid pressure in said chamber and wheel cylinders between a minimum and a predetermined amount, means biasing said valve means initially to one position communicating fluid at said different pressure to said power means, said one piston in the initial valve means abutting position moving said valve means to a second position blocking flow of fluid at said different pressure to said power means while permitting flow of fluid at said one pressure.

References Cited

UNITED STATES PATENTS

| | | | |
|---|---|---|---|
| 2,098,666 | 11/1937 | LaBrie | 60—54.6 |
| 2,949,740 | 8/1960 | Aikman | 60—54.6 |
| 3,064,431 | 11/1962 | Schnell | 60—54.6 |
| 3,222,868 | 12/1965 | Stelzer | 60—54.6 |

FOREIGN PATENTS

| | | |
|---|---|---|
| 765,079 | 1/1957 | Great Britain. |

MARTIN P. SCHWADRON, *Primary Examiner.*
ROBERT R. BUNEVICH, *Examiner.*